UNITED STATES PATENT OFFICE.

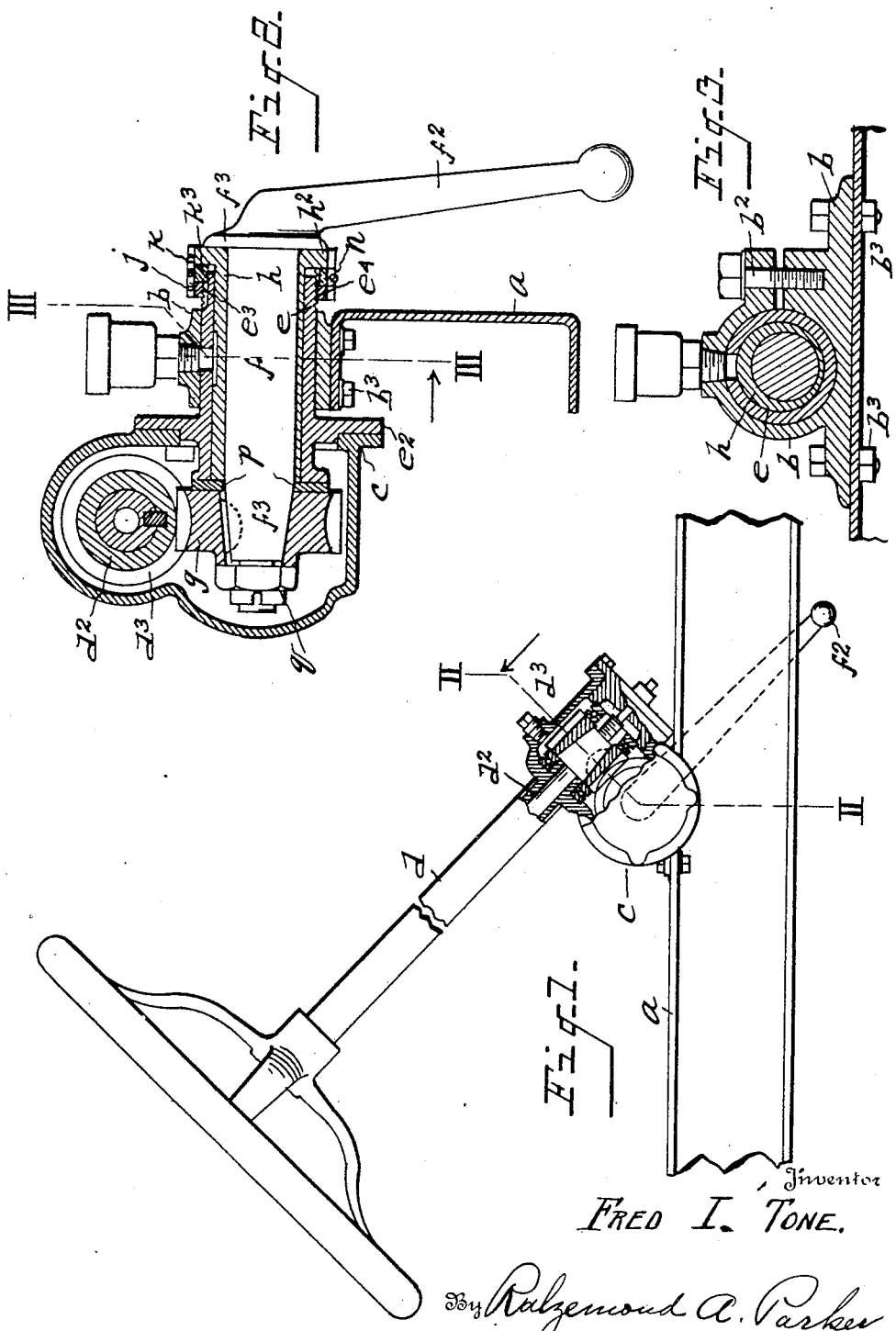

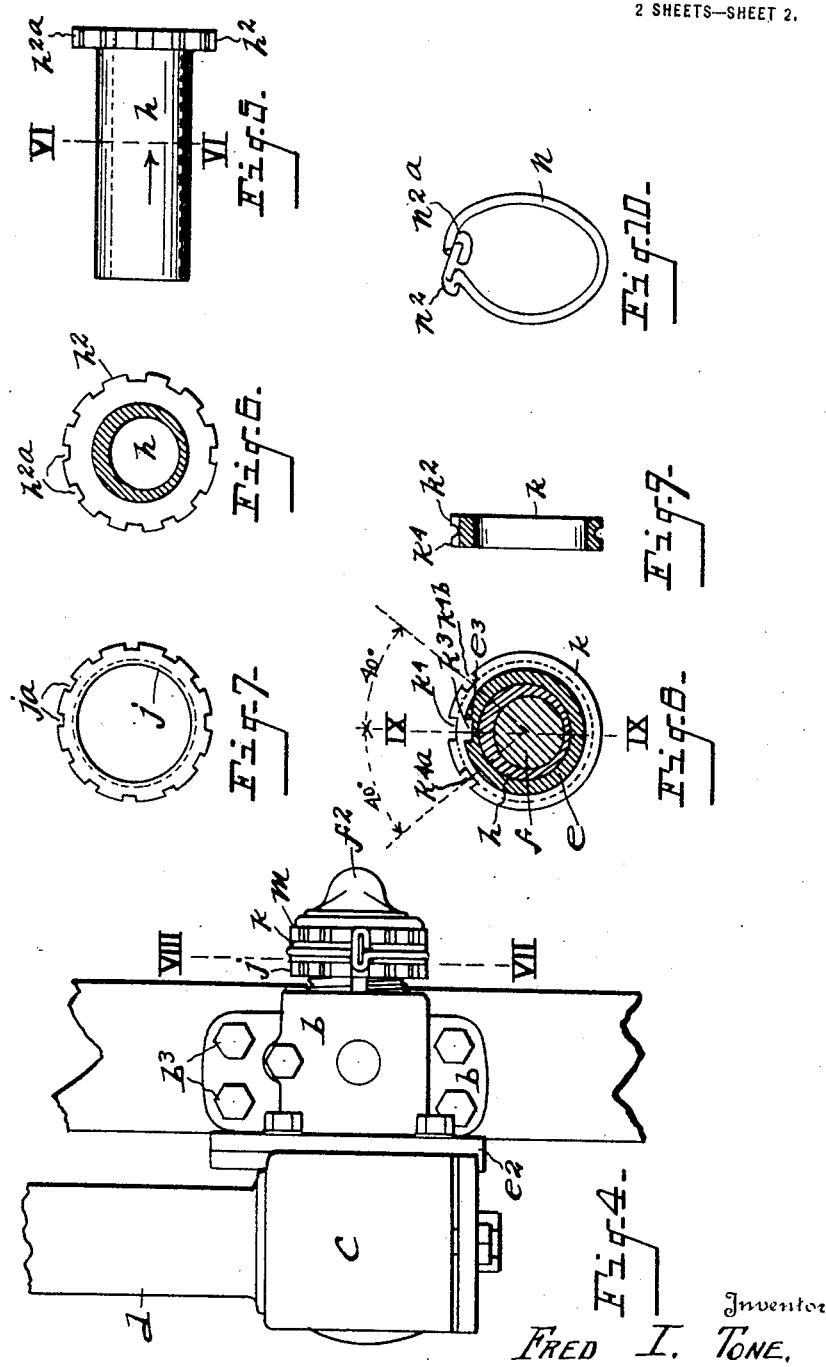

FRED I. TONE, OF DETROIT, MICHIGAN, ASSIGNOR TO CHILD HAROLD WILLS, OF DETROIT, MICHIGAN.

STEERING MECHANISM FOR AUTOMOBILES.

1,396,604.   Specification of Letters Patent.   Patented Nov. 8, 1921.

Application filed February 7, 1920. Serial No. 356,914.

*To all whom it may concern:*

Be it known that I, FRED I. TONE, a citizen of the United States, residing at Detroit, county of Wayne, State of Michigan, have invented a certain new and useful Improvement in Steering Mechanism for Automobiles, and declare the following to be a full, clear, and exact description of the the same, such as will enable others skilled in the art to which it pertains to make and use the same, reference being had to the accompanying drawings, which form a part of this specification.

My invention relates to steering mechanism for automobiles and an object of my improvements is to provide an improved construction that is readily assembled, conveniently adjusted, and permanently fixed in its adjusted position.

I secure this object in the device illustrated in the accompanying drawings, in which:—

Figure 1 is a side elevation of a steering mechanism embodying my invention showing a part of the side piece of the chassis of an automobile to which said mechanism is attached.

Fig. 2 is a section on the line II—II, Fig. 1, looking in the direction of the arrow.

Fig. 3 is a section on the line III—III, Fig. 2.

Fig. 4 is a plan view of the apparatus shown in Fig. 1, the steering wheel being broken away.

Fig. 5 is a side elevation of the eccentric sleeve forming part of said apparatus, detached from the assembly.

Fig. 6 is a section on the line VI—VI, Fig. 5, looking in the direction of the arrow.

Fig. 7 is a plan view of the adjusting nut.

Fig. 8 is a section on the line VIII—VIII, Fig. 4, the securing wire being left off.

Fig. 9 is a diametrical section of the securing ring on the line IX—IX, Fig. 8.

Fig. 10 is a perspective view of the securing wire.

$a$ indicates the side piece of the chassis. $b$ is a flanged sleeve secured by bolts $b^3$ to the upper flange of the side piece $a$ to clamp an inclosed socket in the conventional way, as indicated at $b^2$, Fig. 3. $c$ is a gear housing from which extends the steering post $d$ which incloses the steering shaft $d^2$. Upon the lower end of the steering shaft $d^2$ is keyed the spiral gear wheel $d^3$.

$e$ is a hollow cylindrical socket secured in the clamp $b$. $h$ is an eccentric hollow cylindrical bearing fitted and adapted to turn in the socket $e$. At its outer end the bearing $h$ has an outwardly extending annular flange $h^2$ having symmetrically spaced transverse grooves $h^{2a}$ therein.

$f$ is a spindle fitting and adapted to oscillate in the bearing $h$. The outer end of said spindle is provided with the annular outstanding flange $f^3$, the inner face of which engages against the inner face of the bearing $h$. $f^2$ in the operating arm on the outer end of the spindle $f$. The inner end of said spindle is tapered presenting the conical surface $f^3$ and there is a worm wheel $g$ fitting on said conical surface and keyed to the spindle $f$. $q$ is a nut for securing the worm wheel firmly in position.

$p$ is a shim, acting as a thrust washer, interposed between the inner face of the worm wheel $g$ and the inner end of the socket $e$.

$e^2$ is an outwardly extending annular flange on the socket $e$, near its inner end. The casing $c$ is secured to said flange.

The outer end of the socket $e$ is screw-threaded, as indicated at $e^4$, Fig. 2, and is provided with a longitudinal groove $e^3$ (Figs. 2 and 8) in its outer surface.

$j$ is a nut having internal screw threads adapted to engage the screw threads $e^4$ on the socket $e$. The nut $j$ is provided with uniformly spaced transverse grooves $j^a$ in its outer periphery (Fig 7).

$k$ is a ring adapted to fit over the outer end of the socket $e$ and having an inwardly extending lug $k^3$ adapted to engage in the groove $e^3$ in said socket. The ring $k$ has a groove $k^2$ formed around its periphery and it is provided with a transverse groove $k^4$ in its outer edge.

$n$ is a resilient wire bent in the form of a circle adapted to fit into the groove $k^2$. One end of the ring $n$ is bent so as to project laterally, as indicated at $n^2$ and $n^{2a}$, Fig. 10.

In assembling, the socket $e$ with the housing $d$ secured thereto, is clamped in the flanged sleeve $b$ in its proper position. The nut $j$ is then screwed upon the outer end of the socket $e$ and the ring $k$ is passed over the end of said socket outside of said nut, its lug $k^3$ engaging in the slot $e^3$ in said socket. The eccentric bearing $h$ is then inserted into the socket $e$ and the spindle $f$ is inserted in the bearing $h$. A shim $p$ of proper thickness is then passed over the inner end of the spindle $f$.

The worm wheel $g$ is adjusted to place and secured in position by a key and nut $q$. The nut $j$ is turned acting against the ring $k$ and through said ring against the annular flange $h^2$ on the bearing $h$ to move said bearing outward and said bearing acting against the flange $f^3$ on the spindle $f$ moves said spindle outward until the worm wheel $g$ fits snugly against the shim $p$.

The wire ring $n$ is now adjusted to position in the groove $k^2$ and its end having the lateral extensions $n^2$ and $n^{2a}$, enters the groove $k^4$ in the ring $k$ and a groove $j^a$ in the nut $j$ and a groove $h^{2a}$ in the flange $h^2$ on the outer end of the bearing $h$. Thus the nut $j$ is locked in position and the bearing $h$ is also locked to prevent its rotation.

The projection $n^{2a}$ may be raised out of a groove $h^{2a}$ and the bearing $h$ rotated to adjust the position of the wheel $g$ relative to the spiral nut or worm $g^3$ and will be again locked in position when the resilient wire $n$ is released, bringing the projection $n^{2a}$ back into one of the grooves $h^{2a}$.

In the example shown the nut $j$ is provided with 12 transverse grooves $j^a$ in its periphery which are spaced 30 degrees from each other; and the ring $k$ is provided with two transverse grooves $k^{4a}$ and $k^{4b}$ upon opposite sides of the groove $k^4$ and at an angular distance therefrom different from the spacing of the lugs $j^a$, say, in this instance 40 degrees so that a vernier adjustment may be obtained in this instance of 10 degrees.

Claims:

1. The combination of a steering shaft having a gear wheel thereon, a spindle having an operating arm thereon, and a gear wheel engaging the gear wheel on said shaft, an eccentric bearing for said spindle, a socket piece, said bearing fitting and adapted to turn in said socket piece, one end of the socket piece being screwthreaded, a nut having screw threads engaging the screw threads on said socket, means whereby said nut engages said bearing to adjust the same longitudinally.

2. The combination of a steering shaft having a gear wheel thereon, a spindle having an operating arm thereon and a gear wheel engaging the gear wheel on said shaft, an eccentric bearing for said spindle, a socket piece, said bearing fitting and adapted to turn in said socket piece, one end of the socket piece being screwthreaded, a nut having screw threads engaging the screw threads on said socket, means whereby said nut engages said bearing to adjust the same longitudinally, and a shim between the gear wheel on said spindle and the end of said socket piece.

3. The combination of a steering shaft having a gear wheel thereon, a spindle having an operating arm thereon and a gear wheel engaging the gear wheel on said shaft, an eccentric bearing for said spindle, a socket piece, said bearing fitting and adapted to turn in said socket piece, one end of the socket piece being screwthreaded, a nut having screw threads engaging the screw threads on said socket, means whereby said nut engages said bearing to adjust the same longitudinally, said socket piece being provided with a longitudinal groove in its outer surface, a ring adapted to pass over the end of said socket piece and having a lug engaging in said groove, and means for locking said ring and nut together.

4. The combination of a steering shaft having a gear wheel thereon, a spindle having an operating arm thereon and a gear wheel engaging the gear wheel on said shaft, an eccentric bearing for said spindle, a socket piece, said bearing fitting and adapted to turn in said socket piece, one end of the socket piece being screwthreaded, a nut having screw threads engaging the screw threads on said socket, means whereby said nut engages said bearing to adjust the same longitudinally, said socket piece being provided with a longitudinal groove in its outer surface, a ring adapted to pass over the end of said socket piece and having a lug engaging in said groove, said nut and ring being provided with laterally extending grooves and a locking piece adapted to fit in said groove.

5. The combination of a steering shaft having a gear wheel thereon, a spindle having an operating arm thereon and a gear wheel engaging the gear wheel on said shaft, an eccentric bearing for said spindle, a socket piece, one end of the socket piece being screw-threaded, a nut having screw threads engaging the screw threads on said socket, means whereby said nut engages said bearing to adjust the same longitudinally, said socket piece being provided with a longitudinal groove in its outer surface, a ring adapted to pass over the end of said socket piece and having a lug engaging in said groove, said nut and ring being provided with laterally extending grooves, said ring being provided with a groove around its periphery, a resilient ring adapted to engage in said groove having a lateral extension adapted to engage in the groove in the nut and in the laterally extending groove in said ring.

6. In an apparatus of the kind described, a socket piece, an eccentric bearing in said socket piece adapted to be adjusted longitudinally therein, said bearing having an outwardly extending annular flange at the end of said socket piece, said flange being provided on its periphery with spaced, laterally extending grooves, said socket piece being provided with a longitudinally extending groove in its outer surface, a ring having an inwardly extending lug, said ring being adapted to pass over said socket piece and its lug to engage in the groove in said socket piece, said ring having a transverse slot in its periphery and a locking piece adapted to engage in the laterally extending slot in said ring and in said flange of the bearing.

7. In an apparatus of the kind described, a socket piece, an eccentric bearing in said socket piece adapted to be adjusted longitudinally therein, said bearing having an outwardly extending annular flange at the end of said socket piece, said flange being provided on its periphery with spaced, laterally extending grooves, said socket piece being provided with a longitudinally extending groove in its outer surface, a ring having an inwardly extending lug, said ring being adapted to pass over said socket piece and its lug to engage in the groove in said socket piece, said ring having a transverse slot in its periphery and a locking piece adapted to engage in the laterally extending slot in said ring and in said flange of the bearing, said socket piece being screw threaded at its end, a nut having internal screw threads engaging the threads on said socket piece, said nut being located inside of said ring, a laterally extending groove in the periphery of said nut and a lug piece adapted to engage in the laterally extending grooves in said nut, ring and flange of the bearing.

In testimony whereof, I sign this specification.

FRED I. TONE.